(12) United States Patent
Lakshman et al.

(10) Patent No.: US 9,363,270 B2
(45) Date of Patent: Jun. 7, 2016

(54) PERSONAS IN APPLICATION LIFECYCLE MANAGEMENT

(75) Inventors: T.K. Lakshman, San Carlos, CA (US); Richard Kirchhofer, Fremont, CA (US); Oleg Musteata, Hayward, CA (US); Akshaya Mahapatra, San Jose, CA (US); Radha Popuri, Santa Clara, CA (US)

(73) Assignee: VCE Company, LLC, Richardson, TX (US)

( * ) Notice: Subject to any disclaimer, the term of this patent is extended or adjusted under 35 U.S.C. 154(b) by 265 days.

(21) Appl. No.: 13/538,466

(22) Filed: Jun. 29, 2012

(65) Prior Publication Data

US 2014/0006617 A1  Jan. 2, 2014

(51) Int. Cl.
*H04L 12/24* (2006.01)
*H04L 29/06* (2006.01)
*G06F 21/60* (2013.01)
*G06F 9/445* (2006.01)

(52) U.S. Cl.
CPC ............ *H04L 63/102* (2013.01); *G06F 9/4451* (2013.01); *G06F 21/604* (2013.01); *H04L 63/10* (2013.01); *G06F 2221/2117* (2013.01); *G06F 2221/2141* (2013.01); *G06F 2221/2145* (2013.01); *G06F 2221/2149* (2013.01); *G06F 2221/2151* (2013.01)

(58) Field of Classification Search
None
See application file for complete search history.

(56) References Cited

U.S. PATENT DOCUMENTS

| | | | | |
|---|---|---|---|---|
| 7,685,237 B1 * | 3/2010 | Weaver et al. | ................. | 709/205 |
| 2002/0178270 A1 * | 11/2002 | Riordan | ........................ | 709/229 |
| 2005/0080867 A1 * | 4/2005 | Malik | .................. | G06Q 10/107 709/207 |
| 2005/0080889 A1 * | 4/2005 | Malik | ..................... | H04L 51/12 709/223 |
| 2006/0031489 A1 * | 2/2006 | Marcjan | ................ | G06F 21/606 709/225 |
| 2006/0074806 A1 * | 4/2006 | McKegney | ........ | G06Q 30/0601 705/51 |
| 2006/0253894 A1 * | 11/2006 | Bookman | ........... | H04L 63/0428 726/2 |
| 2007/0036318 A1 * | 2/2007 | Gits | .................... | H04L 12/1813 379/202.01 |
| 2007/0043684 A1 * | 2/2007 | Nehowig et al. | ................. | 705/76 |
| 2007/0198317 A1 * | 8/2007 | Harthcryde et al. | .............. | 705/8 |
| 2007/0266006 A1 * | 11/2007 | Buss | ................................. | 707/3 |
| 2008/0127331 A1 * | 5/2008 | Seidman et al. | ................. | 726/21 |
| 2008/0243915 A1 * | 10/2008 | Shah | .................. | G06F 17/30607 |
| 2008/0256110 A1 * | 10/2008 | Sen | ......................... | G06Q 10/06 |
| 2009/0157570 A1 * | 6/2009 | Pall et al. | ......................... | 706/11 |
| 2009/0183239 A1 * | 7/2009 | Moogala et al. | ................... | 726/4 |
| 2009/0299932 A1 * | 12/2009 | Hodge | ...................... | G06N 5/02 706/45 |
| 2010/0169314 A1 * | 7/2010 | Green | ................ | G06F 17/30864 707/736 |
| 2010/0306775 A1 * | 12/2010 | Appiah et al. | ................. | 718/100 |
| 2011/0219433 A1 * | 9/2011 | Albrecht-Buehler | ............. | 726/4 |
| 2011/0231851 A1 * | 9/2011 | Lategan | ........................ | 718/102 |
| 2011/0296001 A1 * | 12/2011 | Ramstrom | ..................... | 709/224 |
| 2012/0137360 A1 * | 5/2012 | Henderson | ....................... | 726/17 |
| 2012/0163679 A1 * | 6/2012 | Gavita | ............................ | 382/118 |
| 2012/0254842 A1 * | 10/2012 | Henderson | ..................... | 717/136 |

* cited by examiner

*Primary Examiner* — Ninos Donabed

(74) *Attorney, Agent, or Firm* — Polsinelli PC

(57) ABSTRACT

A user management construct, referred to as a persona, is provided to enable a flexible mechanism that grants elevated or administrative privileges to users, such as application developers. Developers may utilize the privileges bestowed by a persona to execute tasks that normally requires access by traditional information (IT) roles, such as IT administrators, to deploy applications in a cloud computing environment. The tasks may include the provisioning of virtual or physical computing resources and/or the configuration of compute, storage, and networking resources.

13 Claims, 4 Drawing Sheets

PERSONAS IN APPLICATION LIFECYCLE MANAGEMENT

FIELD OF THE INVENTION

Embodiments of the present invention generally relate to a method for managing administrative access to a computing platform having a plurality of tiered computing components that support a virtualization environment.

BACKGROUND OF THE INVENTION

Software is increasingly being developed as web applications to be deployed in a cloud computing environment. Software development cycles have shrunk and products are deployed in cloud computing environments with increasing frequency. As such, enterprises engaged in managing application lifecycles (e.g., developing, testing, and deploying applications) face challenges in dealing with various layers of the cloud computing environment that include hardware infrastructure (e.g., computing, networking, and storage), virtualization environments executing thereon, and application services (e.g., database, customer relationship management services, etc.) For example, software developers have been taking on a role, sometimes referred to as "dev-ops", that shares some duties similar to that of a traditional information technology (IT) role. However, traditional enterprise information technology (IT) roles, such as server administrator, UNIX administrator, network, storage, or Exchange administrator, have not adjusted to this trend, and continue to operate in isolation, or in "silos". As a result, use of cloud services in IT administration has caused organizational friction within enterprises, particularly, between developers and IT. For example, it has been difficult for a developer to play the role of an IT administrator when a web application they have developed is deployed in a cloud environment, and the developer does not have administrative credentials to provision resources, set up virtual machines, etc.

SUMMARY OF THE INVENTION

Embodiments of the invention provide an enterprise IT organizational structure, referred to as a "persona", which defines administrative privileges for a specific situation during a lifecycle of an application. Users, such as developers, may be granted membership in, or "adopt", a persona, and then invoke operations that are associated with and authorized for the persona. Personas obviate organizational friction that may result from insufficient authorization between different organizational units (e.g., developers and IT administrators) by introducing amorphous groups of identifies to an existing organizational structure that grants authorization and access control in a transitory role in a controlled manner.

Embodiments of the invention provide a method for managing administrative access to a computing platform having a plurality of tiered computing components. The method includes generating a plurality of personas, each of which defines a different set of administrative tasks that a user having the persona is permitted to carry out. The method further includes selecting one of the personas to be associated with a user to allow the user to carry out the set of administrative tasks defined by the persona.

Embodiments of the invention also provide a method for carrying out administrative access to a computing platform having a plurality of tiered computing components. The method generally includes receiving a request from a user to carry out an administrative task and determining if the user is permitted to carry out the administrative task based on whether the user is associated with a persona that defines a set of administrative tasks that can be carried out by users associated therewith, wherein the administrative task requested by the user is in the set. The method further includes issuing commands to execute the administrative task responsive to determining the user is permitted to carry out the administrative task.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
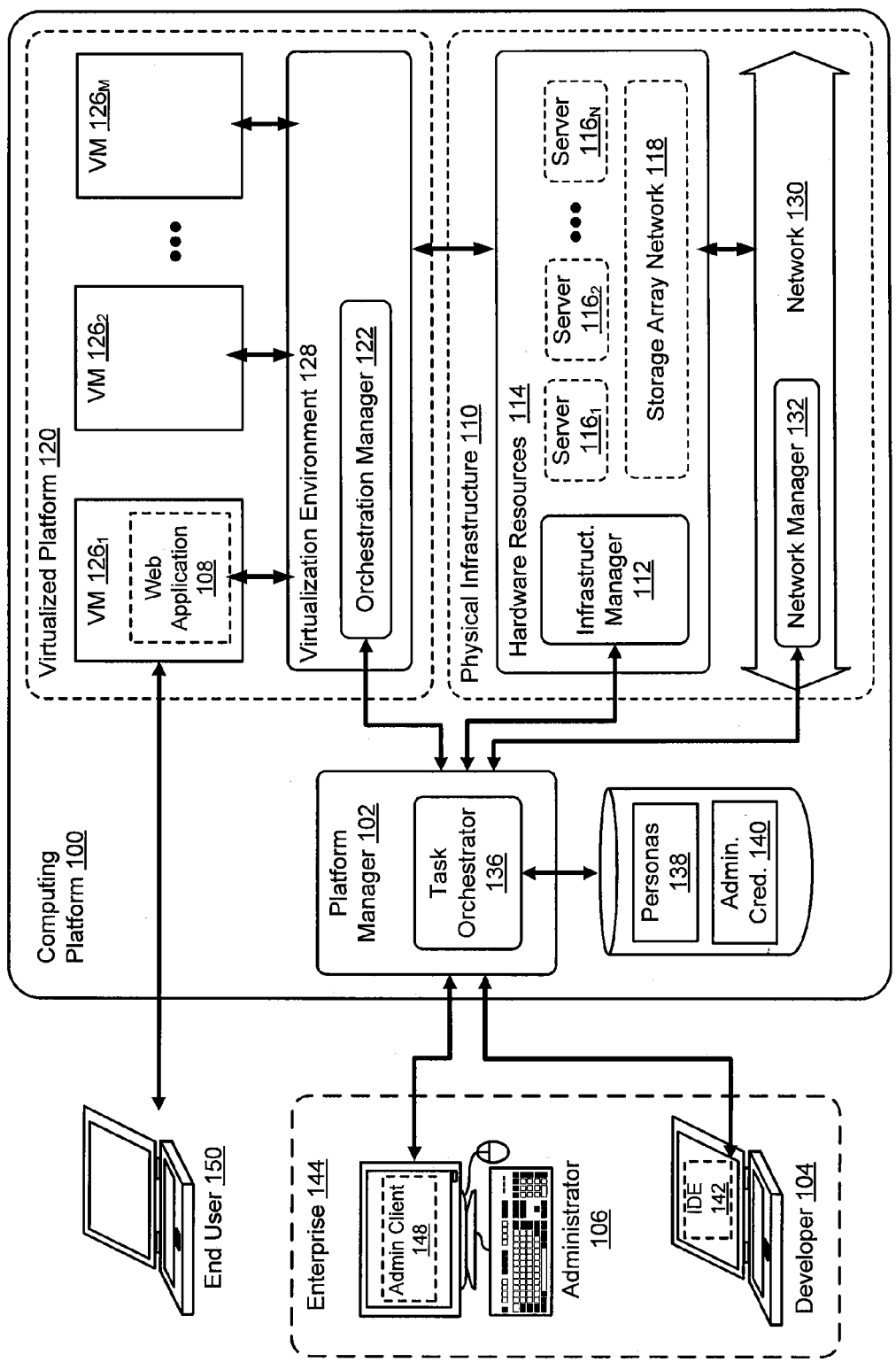
FIG. 1 illustrates a computing platform having a plurality of tiered computing components system configured for providing a virtualization environment according to one embodiment of the invention.

FIG. 1 depicts one embodiment of a computing platform 100 for supporting execution of one or more applications. Computing platform 100 includes a physical infrastructure 110 configured to support a virtualized platform 120. In the particular embodiment shown in FIG. 1, physical infrastructure 110 comprises hardware resources 114, such as servers $116_1$ to $116_N$, and one or more storage array networks (SAN), such as SAN 118, communicatively connected by a network 130, which are configured in a manner to provide a virtualized platform 120 that supports the execution of a plurality of virtual machines across servers $116_1$ to $116_N$. As further detailed below, these virtual machines provide the various services and functions that make up virtualized platform 120. Due to the "layered" nature of computing platform 100, components of computing platform are sometimes referred to as "tiered computing components."

According to one embodiment of the invention, the physical infrastructure 110 may be organized into a "computing-block" based infrastructure, wherein physical infrastructure units are characterized by repeatable units of construction based having similar performance, operational characteristics, and discrete requirements of power, space, and cooling that facilitate rapid deployment, integration, and scalability. The computing-block based infrastructure is configured to dynamically provision hardware resources based on performance demands placed on the physical infrastructure 110. One such example of physical infrastructure 110 is a Vblock™ Infrastructure Platform available from the VCE Company, LLC.

Hardware resources 114 further include an infrastructure manager 112 configured to manage the configuration, provisioning, and policy compliance of the physical infrastructure 110. Infrastructure manager 112 provides an interface by which provisioning of hardware resources 114 (e.g., computing, networking, storage) may be managed with policy-based automation. One example of an infrastructure manager includes EMC Ionix Unified Infrastructure Manager (UIM) available from EMC Corporation. Similarly, network 130 includes a network manager 132 configured to configure network devices (e.g., switches, routers) and manage addressing, subnets, virtual local area networks (VLANs), and other network configurations. One example of a network manager 132 includes a Cisco Switch accessible via a Cisco IOS command line interface (CLI) available from Cisco System, Inc.

The virtualized platform 120 includes a virtualization environment 128 configured to simulate (i.e., to virtualize) conventional components of a computing device, e.g., a processor, system memory, a hard disk drive, for executing one or more virtual machines $126_1$ to $126_M$. For example, each virtual machine 126 may include a virtual processor and a virtual system memory configured to execute an application (e.g., web application 108.) In one example implementation of an embodiment similar to that of FIG. 1, virtualization environment 128 may be implemented by running VMware vSphere®- or VMware ESX®-based hypervisor technologies on servers $116_1$ to $116_n$ provided by VMware, Inc. of Palo Alto, Calif. (although it should be recognized that any other virtualization technologies, including Xen® and Microsoft Hyper-V virtualization technologies may be utilized consistent with the teachings herein). In one embodiment, virtualized platform 120, including VMs $126_1$ to $126_M$, may be configured as a cloud application platform, such as, the VMware vFabric cloud application platform available from VMware, Inc.

Virtualization environment 128 additionally includes an orchestration manager 122 (e.g., implemented as a process running in a virtual machine in one embodiment) that monitors the infrastructure resource consumption levels and requirements of virtualization environment 128. For example, if virtualized platform 120 requires additional VMs to host newly deployed web applications or to scale currently running web applications to support peak performance demands, orchestration manager 122 can manage the instantiation and configuration of additional virtual machines to support such needs. In one example, the orchestration manager 122 may be a virtualization management platform, such as the VMware vCenter virtualized management platform from available from VMware, Inc. of Palo Alto, Calif.

The computing platform 100 further includes a platform manager 102 (e.g., executing on one or more VMs) configured to manage administrative access to components of computing platform 100 (e.g., virtualization environment 128, hardware resources 114, network 130). Platform manager 102 provides a logical control layer by which a user (e.g., developer 104 or administrator 106 of enterprise 144) may manage components of computing platform 100. Platform manager 102 stores administrative credentials 140 for components of computing platform 100. Administrative credentials 140 may include value pairs, such as usernames and passwords, but may also include other suitable authentication mechanisms such as shared key pairs, digital signatures, tokens, etc.

Platform manager 102 includes a task orchestrator 136 that communicates with administrative components of the virtualized platform 120 and physical infrastructure 110 (e.g., orchestration manager 122, infrastructure manager 112, network manager 132), using corresponding administrative credentials 140, to execute one or more administrative tasks. For example, task orchestrator 136 may transmit one or more commands to orchestration manager 122 to clone a VM, create a VM, and/or perform other operations that typically require administrative privileges with orchestration manager 122. In another example, task orchestrator 136 may transmit commands to infrastructure manager 112 to provision a physical blade server having a predetermined service profile, install a virtualization environment on a provisioned server, launch a server with particular software packages therein installed, and other operations that require administrative privileges with infrastructure manager 112. In yet another example, task orchestrator 136 may communicate with network manager 132 to create one or more VLANs, configure routing to a network, and other operations that require administrative privileges with network manager 132.

Platform manager 102 is configured to create and manage "personas" 138 for administrating components of the computing platform 100 (e.g., virtualization environment 128, hardware resources 114, network 130). Personas 138 represent a federated identity for a group of one or more users with transitory authorization to perform administrative tasks on components of the computing platform (e.g., virtualization environment 128, hardware resources 114, network 130) without explicit knowledge of administrative credentials 140 normally required to perform said administrative tasks. Users that are granted membership to, or "adopt", a persona 138 may perform operations on the computing platform 100 using the transitory administrative privileges delegated to them by the personas 138. For example, a "cloud admin" persona may be created with cloud-related privileges (e.g., from a cloud controller) to execute tasks such as deploying an application from a code repository and granting firewall exceptions to freely access an external library site (e.g., rubygems.org). In the described example, developers 104 (or even administrators 106) can then be added to this cloud admin persona be able to deploy application on a cloud computing environment.

While the platform manager 102 is depicted as a single entity in FIG. 1 for the sake of discussion, it is understood that platform manager 102 represents one or more server and/or server applications that may be implemented using a variety of architectures and configurations having multiple components, modules, and/or servers in communication. For example, the task orchestrator 136 of the platform manager 102 may be implemented in one dedicated server or virtual machine, and management of personas and users by the platform manager 102 may be implemented in a separate interface.

Figure 2:
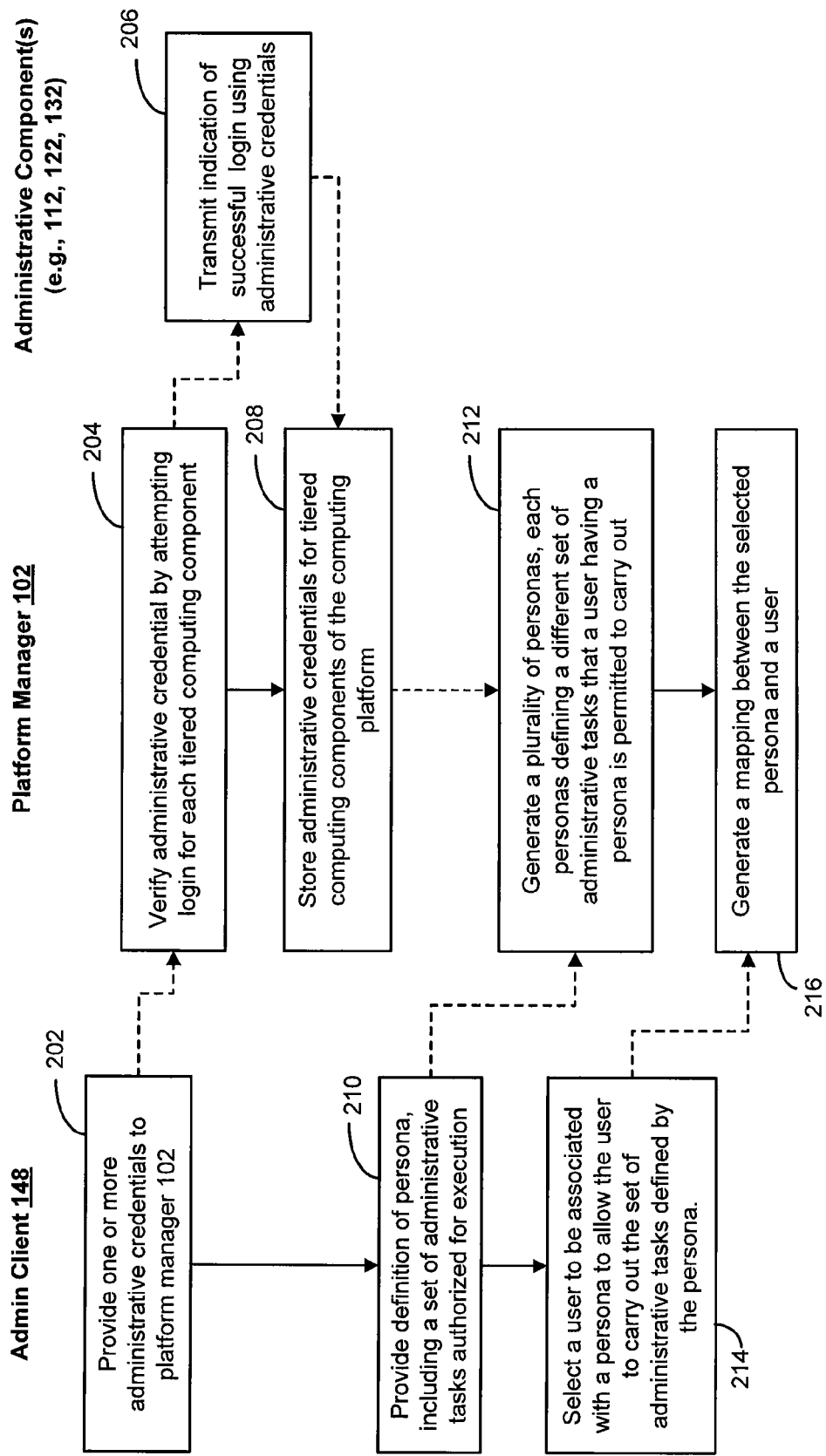
FIG. 2 is a flow diagram of method steps for managing administrative access to a computing platform, according to certain aspects of the present disclosure.

Operations of platform manager 102 are described in further detail in FIG. 2. FIG. 2 is a flow diagram of method steps for managing administrative access to the computing platform 100 of FIG. 1, according to certain aspects of the present disclosure. In one example, an enterprise 144 wishes to develop and deploy a web application 108 (or any other application) on the computing platform 100 to be accessed by end users 150. The enterprise 144 may include users, such as administrator 106, who have knowledge and access to administrative credentials 140 for the computing platform 100. Such users are given a "platform administrator" role that enables them to configure the platform manager 102 as described in the operations of FIG. 2. Other users, such as developer 104, do not have knowledge or access and are otherwise not permitted to view administrative credentials 140. Such users are given a "platform user" role which may adopt personas 138, according to techniques described herein.

In step 202, an administrator 106 operating an administrative client 148 may provide one or more administrative credentials 140 for tiered computing components of computing platform 100 to platform manager 102. In step 204, the platform manager 102 verifies the received administrative credentials by attempting to login into each tiered computing component. In step 206, each of tiered computing components (e.g., orchestration manager 122, infrastructure manager 112, network manager 132) authenticates each login connection attempt using the received administrative credentials and transmits an indication of successful login back to platform manager 102. In step 208, the platform manager 102 securely stores the administrative credentials for tiered computing components of the computing platform in a data store, for example, such as a database table, as shown in FIG. 3.

In step 210, the administrator 106 provides a definition of a persona 138, to platform manager 102, which includes a set of administrative tasks authorized for execution by any users adopting the persona 138. In step 212, platform manager 102 generates a plurality of personas, each persona defining a different set of administrative tasks that a user having a persona is permitted to carry out. In one embodiment, the set of administrative tasks may be organized into "blueprints" which represent a package of administrative tasks to perform an application lifecycle operation, such as deploying or upgrading an application. Platform manager 102 may be utilized to create and modify blueprints, as well as invoke (e.g., execute administrative tasks of the blueprint) and expire (e.g., cease execution of administrative tasks of the blueprint) blueprints. Accordingly, by packaging administrative tasks into blueprints, platform users may indirectly operate the tiered components of the computing platform 100 without need to know any specific administrative credentials 140.

In step 214, administrator 106 selects a user to be associated with a persona to allow the selected user to carry out the set of administrative tasks defined by the persona. In step 216, responsive to user input, platform manager 102 generates a mapping between the selected user and the persona to authorize the selected user to perform the set of administrative tasks. Accordingly, in one example, a user having a persona 138 may utilize the platform manager 102 to invoke a blueprint, which in turn, triggers deployment of an application.

Figure 3:
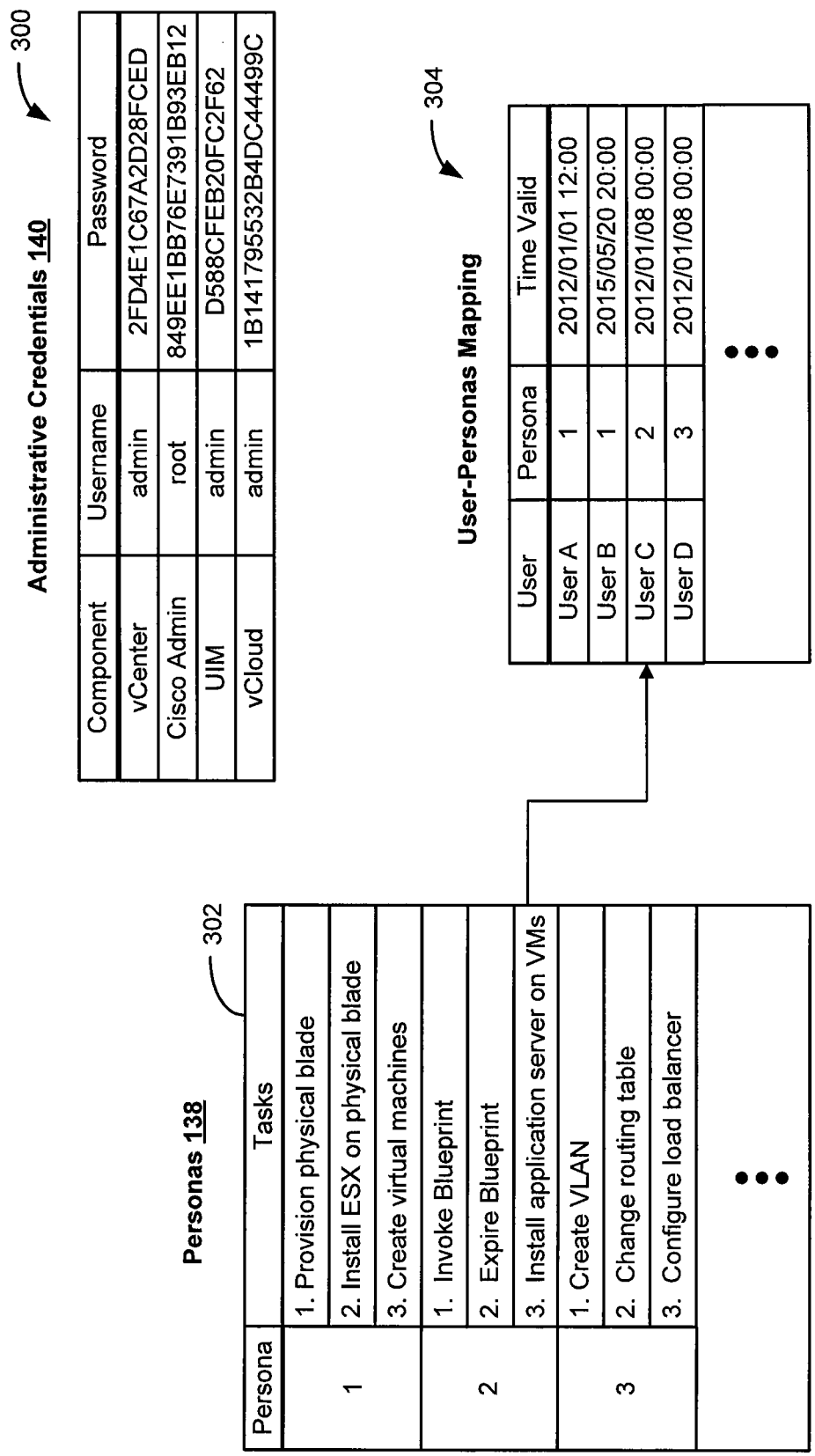
FIG. 3 depicts a mapping between personas and users for managing administrative access to a computing platform, according to certain aspects of the present disclosure.

FIG. 3 depicts a mapping between personas and users for managing administrative access to the computing platform of FIG. 1, according to certain aspects of the present disclosure. The platform manager 102 stores a data structure (embodied as a database table 300 in FIG. 3) that includes information for one or more administrative credentials 140. In one embodiment, for each administrative credential 140, database table 300 includes username and password information for a particular tiered computing component (e.g., vCenter, Cisco Admin, UIM, vCloud Director).

The platform manager 102 stores a data structure (embodied as a database table 302) that includes information regarding a plurality of personas 138 configured to provide administrative access to tiered computing components. According to one embodiment, the personas 138 are associated with one or more administrative tasks that a user having the corresponding persona 138 may be authorized to carry out. For example, a persona identified as Persona #1 in FIG. 3 is associated with administrative tasks to provision one or more physical blades, to install VMware ESX environment on the physical blade, and to create one or more virtual machines. Each of the described administrative tasks may require use of the one or more administrative credentials 140 in table 300.

Platform manager 102 further stores a data structure (embodied as a database table 304) that includes mappings between users (e.g., developers 104) and personas 138. Each user-persona mapping may include a time constraint that represents a time interval for which the mapping is valid. For example, upon expiry of the time constraint, a user having adopted a particular persona may no longer be authorized to carry out a set of administrative tasks associated with the persona. In an alternative embodiment, each user-persona mapping may include a time constraint that represents a time interval by which effects of administrative tasks performed under a given persona are permitted to persist. For example, for a user-persona mapping having a time constraint of 48 days, any computing resources (e.g., virtual machines, database instances) provisioned under the user-persona mapping may persist for a period no longer than 48 days. Upon expiry of the specified time constraint, computing resources, for example, may be de-allocated and returned to a pool of available resources.

Figure 4:
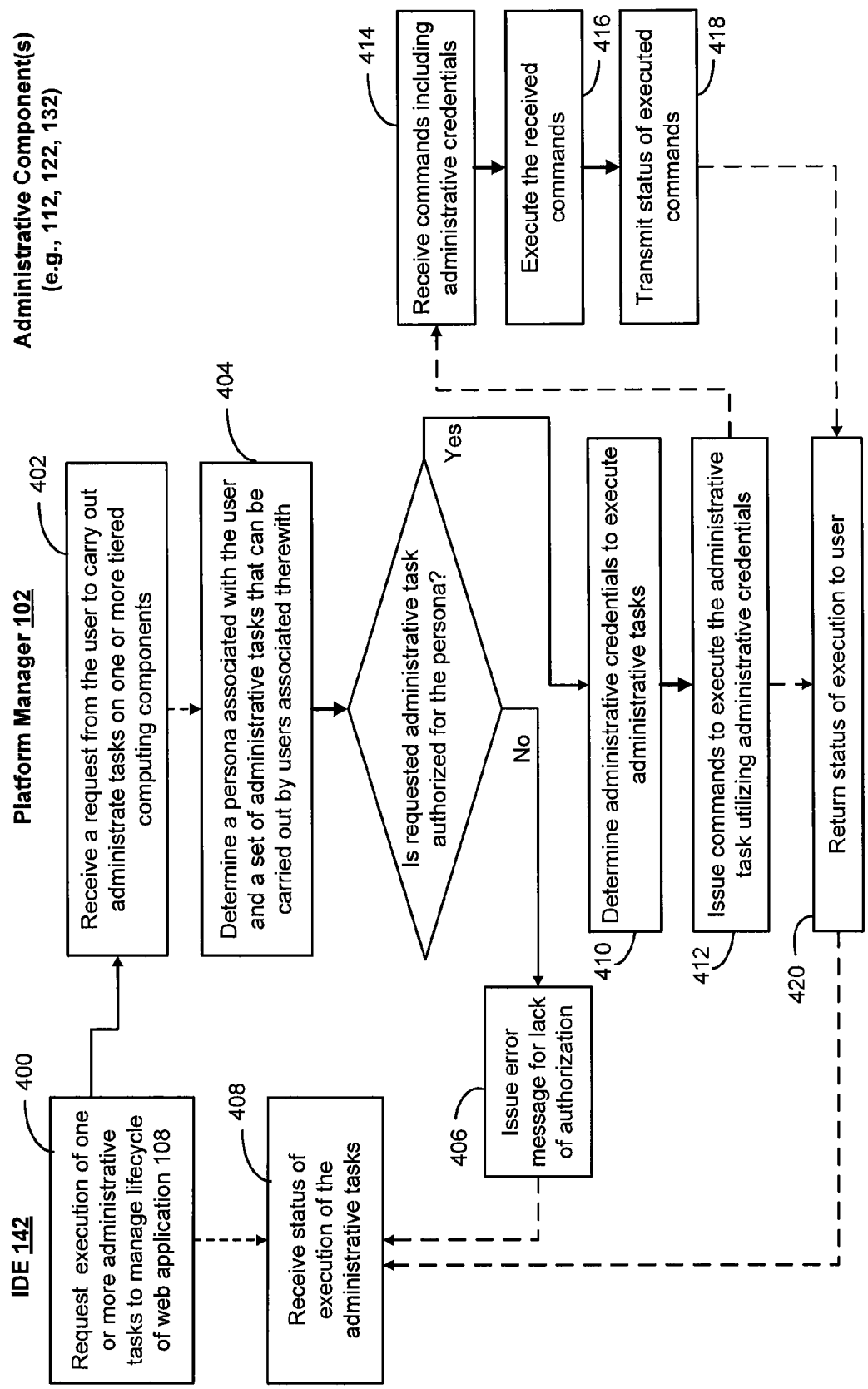
FIG. 4 is a flow diagram of method steps for managing application lifecycles on a computing platform, according to certain aspects of the present disclosure.

FIG. 4 is a flow diagram of method steps for managing application lifecycles on the computing platform of FIG. 1, according to certain aspects of the present disclosure. In one example, a user in enterprise 144 (e.g., developer 104) develops an application, such as web application 108, using an integrated development environment (IDE) 142 installed on the developer's laptop or terminal and wishes to deploy the application within the computing platform 100. The IDE 142 may include an installed plug-in provided by platform manager 102 that facilitates the development and submission of web application 108 to computing platform 100.

In step 400, the IDE 142 may request execution of one or more administrative tasks to manage the lifecycle of the web application 108. For example, the developer 104 may operate the IDE 142 to package the web application 108, transmit the packaged application to platform manager 102, and request deployment of the packaged application onto one or more virtual machines of the computing platform 100. In step 402, the platform manager 102 receives a request from the developer 104 to carry out administrative tasks on one or more tiered computing components. For example, t deployment request may include one or more administrative tasks, such as the provisioning of virtual machines, an allocation of network addresses, configuration of routers to direct requests to the provisioned virtual machine at the allocated network address, and other similar release management operations.

In step 404, the platform manager 102 determines a persona associated with the user, if any, and a set of administrative tasks that can be carried out by users associated with the persona. In step 406, responsive to determining that one or more of the requested administrative tasks are not authorized for the persona, and in turn, for the requesting developer 104, the platform manager 102 returns an error message indicating lack of authorization back to IDE 142. In step 408, the IDE 142 receives the status of the execution of the administrative tasks. Upon receipt of an error message indicating lack of authorization, the developer 104 may take remedial action, such as requesting membership of a persona having authorization to execute the administrative tasks to deploy the web application 108.

Alternatively, in step 410, responsive to determining that the requested administrative tasks are authorized for the persona, and in turn, the developer 104, the platform manager determines administrative credentials 140 that may be necessary to invoke administrative privilege and carry out the administrative tasks on behalf of the developer 104. In step 412, the platform manager 102 transmits commands using via REST (Representational State Transfer) APIs (Application Programming Interface) or any other client-server communication protocols and messaging interfaces, to connect to the appropriate tiered computing component of the computing platform (e.g., orchestration manager 122, infrastructure manager 112, network manager 132) and execute the administrative tasks.

In step 414, the tiered computing component (e.g., orchestration manager 122, infrastructure manager 112, network manager 132) receives commands and administrative credentials from the platform manager 102. In step 416, the tiered computing component authenticates the administrative credentials to earn elevated privileges that are used to execute the received commands from the platform manager 102. In step 418, the tiered computing component transmits status of the executed command back to the platform manager 102, for example, to indicate successful completion of the command and/or provide other status output resultant from the executed command.

In step 420, the platform manager 102 forwards the received status of execution back to the IDE 142 and developer 104. As described above, in step 408, the IDE 142 receives status of execution of the administrative tasks, which may include, for example, an indication of a successful deployment of the web application 108.

Accordingly, embodiments of the invention provide an enterprise access control and enforcement mechanism for users to perform administrative operations or tasks without knowing administrative credentials. Embodiments of the invention enable certain users (e.g., administrators) to determine and describe what abilities a persona has, and to continue to determine which users in an enterprise may be part of the persona, thereby preserving traditional IT privileged roles while enable rapid deployment in cloud computing environments.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

While the foregoing is directed to embodiments of the present invention, other and further embodiments of the invention may be devised without departing from the basic scope thereof, and the scope thereof is determined by the claims that follow.

The invention claimed is:

1. A method for managing administrative access to a computing platform having a plurality of tiered computing components, including a plurality of compute devices, a plurality of network devices, and a virtualization environment, the method comprising:

determining a group of platform administrators comprised of users authorized to configure a plurality of personas;

determining a group of platform users comprised of users authorized to perform administrative tasks on the tiered computing components without knowledge of any administrative credentials for the tiered computing components;

generating, at a server, the plurality of personas, wherein each persona defines a set of administrative tasks that a user associated with the persona is permitted to execute on one or more of the plurality of compute devices, the plurality of network devices, and the virtualization environment, and wherein the persona comprises a federated identity for a group of users having a time-limited administrative privileges on one or more of the plurality of compute devices, the plurality of network devices, and the virtualization environment; and registering, at the server, administrative credentials used to authorize executing administrative commands on each of the plurality of compute devices, the plurality of network devices, and the virtualization environment by:

generating, at the server, a mapping between a first user of the users and a first personas of the plurality of personas to authorize the first user to perform the administrative commands, the mapping including a time constraint indicating how long effects of executing the administrative commands are permitted to persist; and based on the mapping, allow the first user to execute the set of administrative tasks defined by the first persona without knowledge of the registered administrative credentials, wherein the set of administrative tasks are executed on one or more of the plurality of computing devices, the plurality of network devices, and the virtualization environment.

2. The method of claim 1, further comprising:
selecting a second one of the personas to be associated with a second user to carry out the set of administrative tasks defined by the second persona without knowledge of the registered administrative credentials.

3. The method of claim 1, wherein the first user is associated with the first persona for a predefined period of time.

4. The method of claim 3, further comprising: configuring the predefined period of time for each of the personas.

5. The method of claim 1, further comprising:
terminating execution of the set of administrative tasks upon expiry of the time constraint.

6. A non-transitory computer-readable storage medium storing instructions that, when executed by a processor, performs an operation for managing a computing infrastructure having a plurality of tiered computing components, including a plurality of compute devices, a plurality of network devices, and a virtualization environment, the operation comprising:

determining a group of platform administrators comprised of users authorized to configure a plurality of personas;

determining a group of platform users comprised of users authorized to perform administrative tasks on the tiered computing components without knowledge of any administrative credentials for the tiered computing components;

generating the plurality of personas, wherein each persona defines a set of administrative tasks that a user associated with the persona is permitted to execute on one or more of the plurality of compute devices, the plurality of network devices, and the virtualization environment and wherein the persona comprises a federated identity for a group of users having a time-limited administrative privileges on one or more of the plurality of compute devices, the plurality of network devices, and the virtualization environment; and registering administrative credentials used to authorize executing administrative commands on each of the plurality of compute devices, the plurality of network devices, and the virtualization environment by:

generating a mapping between a first user of the users and a first personas of the plurality of personas to authorize the first user to perform the administrative commands, the mapping including a time constraint indicating how long effects of executing the administrative commands are permitted to persist; and based on the mapping, allow the first user to execute the set of administrative tasks defined by the first persona without knowledge of the registered administrative credentials, wherein the set of administrative tasks are executed on one or more of the plurality of computing devices, the plurality of network devices, and the virtualization environment.

7. The non-transitory computer-readable storage medium of claim 6, wherein the instructions further comprise instructions for: terminating execution of the set of administrative tasks upon expiry of the time constraint.

8. The non-transitory computer-readable storage medium of claim 6, wherein the persona comprises a federated identity for a group of users having a time-limited administrative privileges on one or more of the plurality of tiered computing components.

9. A system for managing administrative access to a computing platform having a plurality of tiered computing components including a plurality of compute devices, a plurality of network devices, and a virtualization environment, the system comprising:

at least one server computing device to:

determine a group of platform administrators comprised of users authorized to configure a plurality of personas;

determine a group of platform users comprised of users authorized to perform administrative tasks on the tiered computing components without knowledge of any administrative credentials for the tiered computing components;

generate the plurality of personas, wherein each persona defines a set of administrative tasks that a user associated with the persona is permitted to execute on one or more of the plurality of compute devices, the plurality of network devices, and the virtualization environment, and wherein the persona comprises a federated identity for a group of users having a time-limited administrative privileges on one or more of the plurality of compute devices, the plurality of network devices, and the virtualization environment; and register administrative credentials used to authorize executing administrative commands on each of the plurality of compute devices, the plurality of network devices, and the virtualization environment by:

generating a mapping between a first user of the users and a first personas of the plurality of personas to authorize the first user to perform the administrative commands, the mapping including a time constraint indicating how long effects of executing the administrative commands are permitted to persist; and based on the mapping, allow the first user to execute the set of administrative tasks defined by the first persona without knowledge of the registered administrative credentials, wherein the set of administrative tasks are executed on one or more of the plurality of computing devices, the plurality of network devices, and the virtualization environment.

10. The system of claim 9, wherein the at least one server computing device is further configured to select a second one of the personas to be associated with a second user to carry out the set of administrative tasks defined by the second persona without knowledge of the registered credentials.

11. The system of claim 9, wherein the first user is associated with the first persona for a predefined period of time.

12. The system of claim 11, wherein the at least one server computing device is further configured to configure the predefined period of time for each of the personas.

13. The system of claim 9, wherein the at least one server computing device is further configured to:

terminate execution of the set of administrative tasks upon expiry of the time constraint.

* * * * *